No. 798,824. PATENTED SEPT. 5, 1905.
J. J. PEALING.
BELT TIGHTENING DEVICE.
APPLICATION FILED JULY 14, 1904.

2 SHEETS—SHEET 1.

No. 798,824. PATENTED SEPT. 5, 1905.
J. J. PEALING.
BELT TIGHTENING DEVICE.
APPLICATION FILED JULY 14, 1904.
2 SHEETS—SHEET 2.
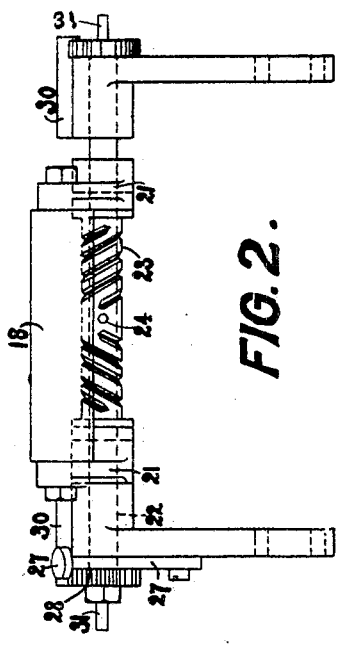
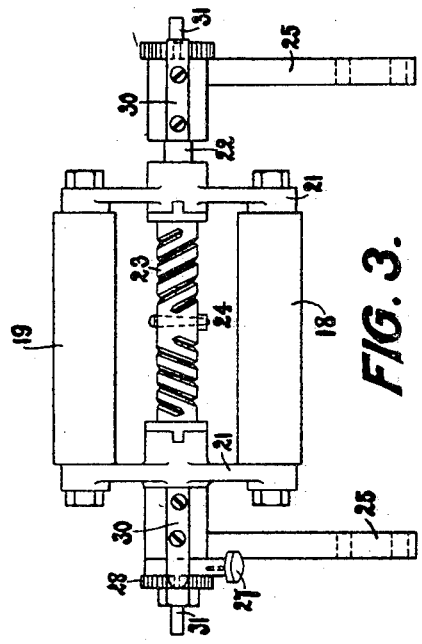
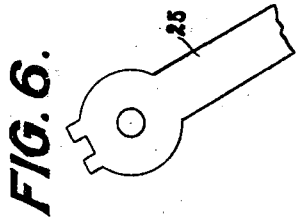
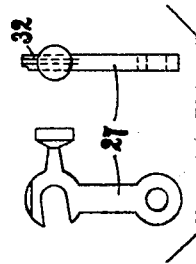
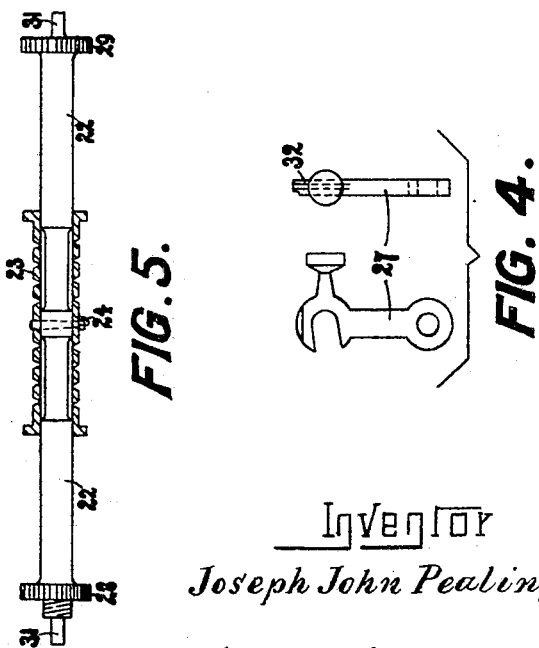
Witnesses
Inventor
Joseph John Pealing

UNITED STATES PATENT OFFICE.

JOSEPH JOHN PEALING, OF LIVERPOOL, ENGLAND.

BELT-TIGHTENING DEVICE.

No. 798,824.  Specification of Letters Patent.  Patented Sept. 5, 1905.

Application filed July 14, 1904. Serial No. 216,552.

*To all whom it may concern:*

Be it known that I, JOSEPH JOHN PEALING, engineer, a subject of the King of Great Britain, and a resident of Liverpool, in the county of Lancaster, England, (whose post-office address is 11 Earle road, Liverpool, aforesaid,) have invented certain new and useful Improvements in Belt-Tightening Devices, (for which application has been made in Great Britain, No. 27,419, dated December 12, 1902,) of which the following is a specification.

This invention has for its object an improved belt-tightening device which automatically takes up any slack in a driving-belt and which can be secured to certain classes of lathes. It is more especially applicable for use with such machines as lathes with rising and falling head-stocks.

In order that the invention may be fully understood, reference will now be had to the accompanying drawings, in which—

Figure 1:
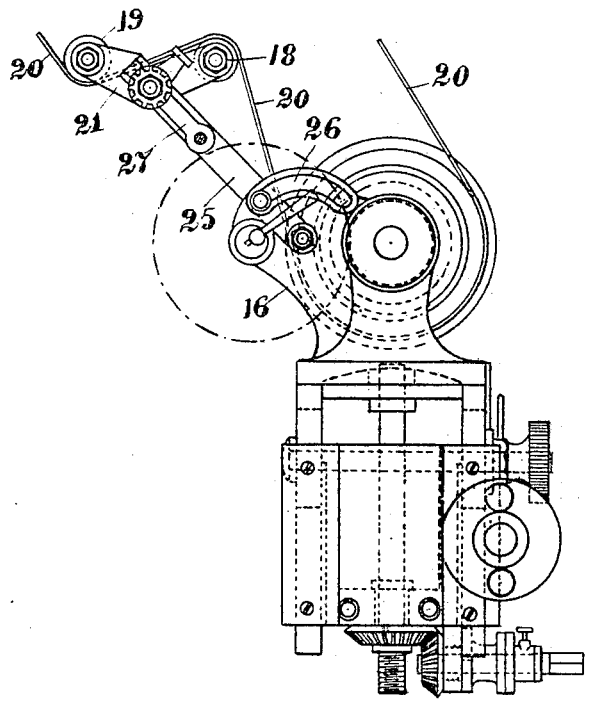
Figure 7:
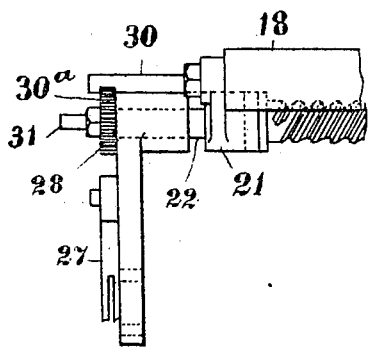

Figure 1 is a side elevation of the device shown as secured to a lathe with a rising and falling head-stock. Figs. 2 and 3 are elevation and plan, respectively, of the belt-tightening gear; Fig. 4, detail views of the locking-lever; and Fig. 5, a detail view, partly in section, of the locking-spindle. Fig. 6 is a detail view of one of the brackets supporting the belt-tightening gear. Fig. 7 is a detail view showing the spindle-locking wheel 28 clear of the engaging pieces 30.

In carrying out the invention in order to maintain the necessary tightness of belt and yet permit of the movement of the head-stock a pair of guide-pulleys 18 19 are provided, one on each side of the running-off part of the belt 20. These pulleys are carried in forked rocking levers 21, mounted on a locking-spindle 22, Fig. 5. In the central portion of the spindle 22 is mounted a right and left handed helical spring 23, preferably cut from one piece of tubing, as shown, and attached at its center to the spindle 22 by a taper pin and nut 24. The ends of the spring are connected to the rocking levers 21, thereby effecting a resilient connection between the spindle 22 and the rocking levers. The spindle is carried from the head-stock by two brackets 25, Fig. 6, so arranged in connection with the slotted quadrant 26 and locking-screw 34 that they may be secured in any suitable permanent position with respect to the counter-shaft.

The slotted quadrant is made in the supports 16, which are shown cast onto the head-stock of the lathe. It is obvious that for certain types of lathes it might form a separate casting and be suitably secured by nuts and bolts or set-screws.

Assuming the head-stock to be in its lowest position, the locking-lever 27 is drawn out clear of the spindle and locking-wheel 28, so allowing the spindle and locking-wheels 28 29 to be moved axially until the locking-wheel teeth are clear of the engaging pieces 30, rigidly attached to the brackets 25, the wheel 28 coming to rest under the recess 30ᵃ in the respective engaging piece 30, as in Fig. 7. By means of keys taking on the squared ends 31 of the spindle 22 the latter may now be rotated in the direction to wind up the spring; but as the rocking levers 21 are prevented from rotating, the belt on the pulleys being assumed tight, the spring 23 will become more or less wound up in proportion to the angle through which the spindle is rotated. The spring being held, the spindle is moved back axially until the catches of the engaging pieces 30 gear with the teeth of the locking-wheels. The locking-lever 27, the jaws of which are saw-cut, as shown at 32, Fig. 4, so that it may bind between the bracket 23 and locking-wheel 28, is then pressed home. If now the head-stock be raised, the resulting slackness of the belt will be taken up by the guide-pulleys 18 19, tending to rotate under the torsional influence of the spring 23.

I declare that what I claim is—

1. A belt-tightening device, comprising two pulleys, rocking levers carrying said pulleys, a spindle carrying said levers, brackets for supporting said spindle, right and left handed springs adapted to produce a torsional effect between the rocking levers and the spindle, locking means between the spindle and the brackets to prevent relative rotary movement of said parts, and a movable hooked lever for securing the spindle against axial movement, substantially as and for the purpose set forth.

2. A belt-tightening device comprising a spindle, rocking levers on said spindle, pulleys carried by said levers, torsion-producing means between said levers and the spindle, mountings for said spindle adapted to allow of axial play of the spindle, toothed wheels on said spindle, teeth projecting from said mountings and adapted to engage with said toothed wheels in one axial position of said spindle, and a hooked lever adapted to take over and prevent axial movement of the spindle when in its locked position.

In witness whereof I have hereunto signed my name, this 28th day of June, 1904, in the presence of two subscribing witnesses.

JOSEPH JOHN PEALING.

Witnesses:
 HUBERT PUMPHREY,
 THOMAS S. SHILLINGTON.